(12) United States Patent
Daute

(10) Patent No.: US 9,096,738 B2
(45) Date of Patent: Aug. 4, 2015

(54) LUBRICANT FOR THERMOPLASTIC POLYMERS

(75) Inventor: Peter Daute, Beverstedt (DE)

(73) Assignee: Emery Oleochemicals GmbH (DE)

( * ) Notice: Subject to any disclaimer, the term of this patent is extended or adjusted under 35 U.S.C. 154(b) by 361 days.

(21) Appl. No.: 13/132,246

(22) PCT Filed: Nov. 26, 2009

(86) PCT No.: PCT/EP2009/065869
§ 371 (c)(1),
(2), (4) Date: Sep. 20, 2011

(87) PCT Pub. No.: WO2010/063631
PCT Pub. Date: Jun. 10, 2010

(65) Prior Publication Data
US 2012/0005991 A1    Jan. 12, 2012

(30) Foreign Application Priority Data

Dec. 1, 2008  (DE) .......................... 10 2008 059 744

(51) Int. Cl.
| C08K 5/11 | (2006.01) |
|---|---|
| C08K 5/12 | (2006.01) |
| C08L 27/04 | (2006.01) |
| C08K 5/00 | (2006.01) |
| C08K 5/103 | (2006.01) |
| C08K 3/00 | (2006.01) |

(52) U.S. Cl.
CPC ............... *C08K 5/103* (2013.01); *C08K 3/0008* (2013.01); *C08K 5/0008* (2013.01)

(58) Field of Classification Search
CPC .............. C08K 5/11; C08K 5/12; C08K 5/00; C08L 27/04
USPC .......................... 524/284, 306, 315, 527, 296
See application file for complete search history.

(56) References Cited

U.S. PATENT DOCUMENTS 6,818,689 B1 * 11/2004 Lindner ........................ 524/296

FOREIGN PATENT DOCUMENTS

| GB | 2075031 A | 11/1981 |
|---|---|---|
| WO | 2006017050 A1 | 2/2006 |
| WO | WO 2006017050 A1 * | 2/2006 |
| WO | WO 2006110112 A2 * | 10/2006 |

OTHER PUBLICATIONS

PCT/EP2009/065869—written opinion of the International Searching Authority—Jun. 1, 2011.*
European Patent Office, International Search Report for corresponding application No. PCT/EP2009/065869, dated May 11, 2010 (2 pages).

* cited by examiner

*Primary Examiner* — Ling Choi
*Assistant Examiner* — Ronald Grinsted
(74) *Attorney, Agent, or Firm* — Wood, Herron & Evans, LLP

(57) ABSTRACT

The invention relates to a polymer composition, comprising at least one thermoplastic polymer, at least one pigment or at least one filler or a mixture thereof and at least one diester of a linear diol having 2 to 8 C-atoms with a linear or branched, saturated or unsaturated monocarboxylic acid having 6 to 44 C-atoms, wherein the fraction of diesters comprising different fatty acid radicals in a molecule is less than 10% by weight with regard to the total amount of diesters.

17 Claims, No Drawings

LUBRICANT FOR THERMOPLASTIC POLYMERS

This Application is a U.S. National Phase of PCT/EP2009/065869 entitled "Lubricant For Thermoplastic Polymers" filed Nov. 26, 2009, which claims the benefit of DE Application Serial Number 10 2008 059 744.9 entitled "Lubricant For Thermoplastic Polymers" filed Dec. 1, 2008, the disclosures of which are hereby incorporated by reference herein.

The object of the invention is a polymer compound, comprising at least one thermoplastic polymer, at least one pigment or at least one filler or a mixture thereof and at least one diester of a linear diol with 2 to 8 C-atoms with a linear or branched, saturated or unsaturated monocarboxylic acid with 6 to 44 C-atoms, wherein the amount of diesters with different fatty acid residues is less than 10% by weight, based on to the total amount of diesters.

Thermoplastic polymers are very popular in the production of molds of all kinds. Usually thermoplastic polymers are processed to create such molds in several stages, wherein usually at least one step is required for heating the polymers, wherein the heating is frequently to a temperature at which the thermoplastic polymer exhibits an adequate rheological profile for further processing. Further processing steps are often associated with an intensive mixing of thermoplastic polymers and other ingredients and with shearing of the polymer. In the context of such further processing steps, an internal mixture of the different components of a mixture of a thermoplastic polymer and other ingredients used to form the mold.

To improve the workability of the material in the production of molds, a so-called lubricant is frequently added to such mixtures of thermoplastic polymers and possibly other ingredients.

Thus for example DE 38 12 014 discloses the use of ethylene glycol esters in Ca/Zn stabilizers. As ethylene glycol esters, esters of ethylene glycol with technical palmitic/stearic acid cuts (approx. 1:1) are used.

It has been established that especially with thermoplastic polymers that contain pigments or fillers, the gloss of the surface frequently leaves a lot to be desired when alkyl glycol esters are used. In particular rough or sometimes matt surfaces are produced which can have an adverse effect on a mold produced from such a thermoplastic polymer.

There is therefore a need for a lubricant for thermoplastic polymers that overcomes the disadvantages of the existing state-of-the-art solutions. In particular there was a need for a lubricant for thermoplastic plastics that results in an improvement in the structure of the thermoplastic polymer. For example, there was a special need for a lubricant that enables the thermoplastic polymer and in particular the mold created from such a thermoplastic polymer to achieve an improved surface structure. In particular there was a need for a lubricant that provides a mold made from a thermoplastic plastic with a surface that is less matt or rough and in particular has an improved gloss.

It has now been found that pigment- or filler-containing polymer compounds that contain one or more diesters of a linear diol with 2 to 8 C-atoms with a linear or branched, saturated or unsaturated monocarboxylic acid with 6 to 44 C-atoms can produce molds with surfaces that have improved values with respect to gloss or rough-ness if in such a polymer composition the amount of diesters with different fatty acid residues in a molecule is less than 10% by weight based on to the total amount of diesters.

An object of the present invention is therefore a polymer compound comprising as composition components Z1 at least 15% by weight, based on the polymer composition, of at least one thermoplastic polymer;

Z2 0.001 to 15% by weight, based on the polymer composition, of a diester of a linear diol with 2 to 8 C-atoms with a linear or branched, saturated or unsaturated monocarboxylic acid with 6 to 44 C-atoms; and Z3 0.1 to 80% by weight, based on the polymer composition, of at least one pigment or at least one filler or a mixture thereof, wherein the amount of diesters with different fatty acid residues on a diol is less than 10% by weight, based on the total amount of diesters, or less than 8% by weight, based on to the total amount of diesters.

A polymer compound in the meaning of the present invention is to be understood as a composition in the meaning of the claims that comprises at least one thermoplastic polymer, one diester of a linear diol as well as one pigment or filler. A polymer composition in the meaning of the invention can in principle be in any form, for example, as a powder, granulate, in any form of prepared semi-finished material such as pellets, rods, cubes or similar.

A polymer composition in the meaning of the invention comprises in the context of the invention at least 15% by weight based on to the polymer composition, of at least one thermoplastic polymer.

In principle, according to the invention all polymers can be used that are known to the average skilled person whose properties, in particular regarding their surface properties, for example in relation to the gloss or roughness, of molds made thereof to thermoplastic polymers to be improved. A polymer that is suitable as component of the polymer composition according to the invention is for example selected from the group consisting of polyvinyl chloride (PVC), polypropylene (PP), polyethylene (PE), polyethylene terephthalate (PET), polylactate (PLA), polycarbonate, polystyrolene, polyurethane, poylether, rubber, preferably polyisoprene, natural rubber, especially NBR rubber, polybutadiene, copolymers from at least two of the above, especially polyethylene/polypropylene-copolymers and mixtures of at least two of them. PE, PP, PVC, PET and PLA are preferred and PVC is especially preferred.

In an embodiment of the invention, the polymer compound according to the invention is thermoplastic and does not melt under 80° C., preferably at or under 140° C. and especially preferably at or under 270° C. Usually the thermoplastic compounds according to the invention fuse at 350° C. or less. In the thermoplastic polymer compounds according to the invention, thermoplastic polymers with more than 50% by weight, preferably more than 75% by weight and especially preferred more than 90% by weight, respectively based on the polymer(s) used in the thermoplastic compound, with such fusion characteristics are used.

A polymer compound according to the invention comprises in the context of the invention at least 15% by weight based on the polymer composition, at least one thermoplastic polymer. The upper limit for the contents of thermoplastic polymers can be, for example, at 99.899% by weight, respectively based on the entire polymer compound or can be below it, for example at 98% by weight, 96% by weight, 94% by weight, 92% by weight, 90% by weight or below it, for example at 85% by weight, 80% by weight, 75% by weight, 70% by weight, 65% by weight, 60% by weight, 55% by weight or 50% by weight. Moreover it is also possible for a polymer compound comprises according to the invention to contain less thermoplastic polymers, for example 45% by weight or less, for example 40 5% by weight or less, 35% by weight or less, 30% by weight or less, 25% by weight or less or 20% by weight or less. Depending on the desired application, the lower limit of the amount of thermoplastic polymers may lie for example at 15% by weight, for example at 16, 17, 18, 19 or 20% by weight, respectively based on the total polymer composition.

A polymer composition according to the invention should exhibit thermoplastic properties. This however does not preclude a polymer compound according to the invention having an amount of non-thermoplastic polymer constituents, for example an amount of duromers (sometimes referred to in the literature as duroplastics), which amount however may not exceed an amount that adversely affects the thermoplastic properties of the entire composition so that thermoplastic processing is only possible if serious disadvantages are accepted.

In addition to at least one thermoplastic polymer as per component Z1, a polymer composition in the meaning of the invention also has as component Z2, 0.001 to 15% by weight, based on the entire polymer composition, a diester of a linear diol with 2 to 8 C-atoms with a linear or branched, saturated or unsaturated monocarboxylic acid with 6 to 44 C-atoms. It is important within the scope of the present invention that the amount of diesters with different fatty acid on a diol is less than 10% by weight, based on the total amount of diesters, or less than 8% by weight, based on to the total amount of diesters.

As the basis for diesters to be used in the meaning of the invention, linear diols with 2 to 8 C-atoms are suitable. Suitable linear diols are for example ethylene glycol, n-propylene glycol, n-butylene glycol, n-pentamethylene glycol, n-hexamethylene glycol, n-heptamethylene glycol or n-octamethylene glycol. Suitable embodiments of the invention are the diesters of ethylene glycol, propylene glycol, butylene glycol, pentamethylene glycol or hexamethylene glycol, especially the diesters of ethylene glycol, propylene glycol or butylene glycol, wherein in many cases the esters of ethylene glycol exhibit excellent properties The acid component of the diester of linear diol to be used according to the invention has a carboxylic acid with 6 to 44 C-atoms. An "acid component" in the meaning of this invention is that molecular fraction of the ester that during an ester hydrolysis, for example in the context of acidic or alkaline initial hydrolysis in the aqueous medium would be detectable as acid in the reaction mixture. A diester usable in accordance with the invention has two identical acid components on one molecule. According to the invention, it is possible that a diester to be used in the context of the polymer composition still has fractions of diester molecules with differing acid components. According to the invention, the fraction of such diester molecules with different acid components should be less than 10% by weight, for example less than 9.5% by weight or less than 9% by weight or less than 8% by weight or less than 7.5% by weight or less than 7% by weight or less than 6, 5, 4, 3, 2 or 1% by weight, respectively based on the total fraction of diesters in the polymer composition. Also the diesters used in the previously described polymer composition according to the invention can have a fraction of diesters with different fatty acid residues on a diol of at least 0.1% by weight or 0.01% by weight, or 0.001% by weight, respectively based on the total amount of diesters.

In the meaning of the invention it has proved to be especially effective if the diester is a linear, saturated or unsaturated monocarboxylic acid with 8 to 22 C-atoms, especially with 10 to 20 or 12 to 18 C-atoms.

Basically the following are suitable for use as fatty acids. caproic acid, enanthic acid, caprylic acid, pelargonic acid, capric acid, lauric acid, myristic acid, palmitic acid, margaric acid, stearic acid, arachidic acid, behenic acid, lignoceric acid, cerotic acid, montan acid, melissic acid, undecylenic acid, myristoleic acid, palmitoleic acid, petroselinic acid, oleic acid, elaidic acid, vaccenic acid, gadoleic acid, eicosenic acid, cetoleic acid, erucic acid, nervonic acid, linoleic acid, a-linolenic acid, y-linolenic acid, calendic acid, punicic acid, a-eleostearic acid, arachidonic acid, timnodonic acid, clupanodonic acid, cervonic acid or the so-called Dimer fatty acids, as available through dimerization of unsaturated fatty acids with up to 22 C-atoms. In the context of a preferred embodiment of the present invention, the acid residue of the diester according to the invention is a linear saturated or unsaturated monocarboxylic acid with 8 to 22 C-atoms. Preferably the acid involved will be capric acid, lauric acid, myristic acid, palmitic acid, margaric acid, stearic acid, arachidic acid or behenic acid, in particular palmitic acid, stearic acid or arachidic acid.

A polymer composition according to the invention can contain a diester, or a mixture of two or more diesters. It is however important in this context that the aforementioned upper limit for asymmetrically substituted diesters, i.e. for diesters with different acid components is observed. A polymer composition according to the invention can then for example contain a mixture of two different diesters or a mixture of three different diesters or a mixture of four or more different diesters.

As component Z3 a polymer composition according to the invention comprises at least one pigment or at least one filler or a mixture of one or more fillers and one or more pigments.

Basically all inorganic or organic pigments are suitable for the polymer composition as such and especially with the polymer composition in the context of the planned processing. Pigments can give the polymer composition a color, there are however suitable pigments that color the polymer composition white or black. Especially suitable pigments are for example: titanium dioxide, pigments based on zirconium oxide, barium sulfate, zinc oxide (zinc white) and lithopone (sulfite/barium sulfate), carbon black, carbon black-titanium dioxide mixtures, iron oxide pigments, antimony oxide, chromium oxide, spinels, such as cobalt blue and cobalt green, cadmium sulfite, cadmium selenite, ultramarine blue, or organic pigments such as azo pigments, phthalocyanine pigments, quinacridone pigments, perylene pigments, diketopyrrolopyrrole pigments or anthraquinone pigments.

The following materials are particular suitable as fillers: calcium carbonate, dolomite, gypsum, wollastonite, magnesium oxide, magnesium hydroxide, silicates, china clay, talc, glass fibers, glass beads, wooden beads, mica, metal oxides or metal hydroxides, carbon black, graphite, rock flour, heavy spar, glass fibers, talc, kaolin or chalk or metal sulfates, such as heavy metal sulfates, which in addition to a filling or pigmenting effect, can also, for example, have a stabilizing effect on the polymer composition.

The fraction of pigments or fillers or mixtures of one or more pigments and one or more fillers in the total polymer composition is 0.1 to 80% by weight based on the polymer composition. It is intended according to the invention that a polymer composition will only contain small amounts of pigments or fillers, for example 0.5 to about 10 or 1 to about 5% by weight. It is also possible that a polymer composition according to the invention comprises larger quantities of pigments or fillers or their mixtures, for example about 10% to about 75% or about 20% to about 70% or about 25% to about 60% or about 30% to about 55% or about 35% to 50% or about 40% to about 45% by weight, respectively based on to the entire polymer composition.

In further embodiments of the invention, the polymer composition comprises other additives as composition constituents, selected from a group consisting of stabilizers, other lubricants, softeners, antiblocking agents, anti condensation agents, anti static agents, fire retardants, colors, pigments, propellants, fillers, fats, oils, antioxidants, solvents or a mixture of two or more thereof. Other standard additives for plastic preparation can also be added.

Stabilizers protect plastics such as PVC from decomposing or chemically changing at high temperatures. They thus improve the weathering resistance. Compounds based on, for example, lead, calcium, zinc, barium or tin are used.

Other lubricants are used for example to facilitate the processing of polymers by reducing the friction between the polymer chains and help to reduce the wall adhesion of the flux. Frequently used lubricants are metal soaps such as lead and calcium stearate and laurate that can act at the same time as co-stabilizers.

Softeners give the plastic malleability and flexibility. Many softeners belong to the phthalate group (DEHP, DINP and DIDP), as well as the adipates and citrates.

Anti-fogging agents are designed to prevent formation of condensation on the surface. Such anti-fogging agents are for example listed in DE 10 2004 038 980 AI and in the Plastics Additives Handbook, 5th Edition, Hanser Verlag, pp. 609 to 626 and can be ordered from Cognis Oleochemicals GmbH.

Antiblocking agents are additives that prevent or reduce the sticking ("blocking") of coated surfaces to each other or to substrates (e.g. when stacked or packaged). Depending on the airing time, degree of dryness, layer thickness, pressure or temperature at a certain load, a suitable release agent must be selected that is usually added to the coating substance and reaches the surface during the drying phase. For this purpose, among others, paraffin, polyethylene wax, wax ester, silicone oils, stearates, modified silicas and talc are used.

As a solvent water or organic solvents such as alcohols, e.g. polyglycol, especially polyethylene glycol or polypropylene glycol or a mixture of the above can be used.

Both duromers ("duroplastics") as well as thermoplastic polymers can in principle be used according to the invention. A polymer composition is preferably a thermoplastic or elastic polymer composition. Thermoplastic polymer compositions are reversibly deformable above a certain temperature range. In further embodiments of the invention, the polymer composition is not cross-linked or capable of being cross-linked, for example for the production of elastomers.

Stabilizers protect plastics such as PVC from decomposing or chemically changing at high temperatures and improve weathering resistance. Compounds based on, for example, lead, calcium, zinc, barium or tin are used.

Water or organic solvents such as alcohols can be used as the solvent.

In a preferred embodiment of the invention, a thermoplastic polymer composition is used. Thermoplastic polymer compositions are reversibly formable above a certain temperature range. In other embodiments of the invention, the polymer composition is a non-reticulated, reticulatable polymer composition, for example for the production of elastomers.

Another object of the invention is a method for the production of a mold, wherein the polymer composition according to the invention is processed to create such a mold. A "mold" in the meaning of the invention is a polymer mass that is shaped to create a 3-dimensional spatial form. It may also be a mold obtained by thermal deformation. Such molds are for example obtained by processing of thermoplastics according to established processes. The mold may however also be a reticulated or vulcanized mold. Such molds are for example obtained by processing elastomers.

Another object of the invention is a mold comprising a polymer composition according to the invention or produced from a polymer composition according to the invention.

The thermoplastic polymer compositions according to the invention can generally be shaped to create the molds according to the invention according to generally accepted processes. In the method, the polymer preparations can be initially cured according to known methods, for example by working in of additives or by conversion of the polymer composition into a suitable form such as granulates, powders, pastes or solutions. If necessary the polymer compositions will be mechanically processed, that is dispersed, kneaded or granulated. Processing to create molds is for example by means of injection molding or extrusion. If necessary the mold parts are reworked, that is molded, cut, surface treated or welded. Curable polymer compositions are hardened to mold parts after pressing or forming.

Another embodiment of the methods for the use for the production of a molded article, comprising the method steps:
I) the provision of the thermoplastic polymer composition according to the invention;
II) heating the thermoplastic polymer composition to the glass transition temperature of the thermoplastic polymer or to a temperature above the glass transition temperature of the thermoplastic polymer;
III) Producing a molded article from the thermoplastic polymer composition produced, heated, in Step II)

In Step I) of the method according to the invention for production of a molded article, a thermoplastic composition according to the invention is first made available, wherein the composition is preferably provided by a method according to the first version of the method according to the invention.

Then in method step II) the thermoplastic composition is heated to the glass transition temperature of the thermoplastic polymer or a temperature below the glass transition temperature of the thermoplastic polymer. In this context it is in turn preferred that the heating of the thermoplastic composition is to a temperature in a range of 5 degrees below the glass transition temperature ($T_g$) up to 100° C. above the glass transition temperature of the used thermoplastic polymer, especially preferred to a temperature in a range from 1 degree below the glass transition temperature ($T_g$) to 50° C. above the glass transition temperature of the employed thermoplastic polymer, wherein here too the upper boundary of the temperature range basically depends on the decomposition temperature of the thermoplastic polymer employed.

In principle the method steps I) and II) can be performed simultaneously or sequentially. A simultaneous performance of method steps I) and II) is for example useful if the thermoplastic composition is produced by means of a melting mixing method. In this case, too, it may be advantageous to transfer the composition produced by the melting mixing method directly to a molded article.

Sequential performance of method steps I) and II) is, for example, a good idea when although the thermoplastic polymer is produced by means of a dry mixing method or if the thermoplastic polymer is produced by a melting mixing method, the molded article is not formed immediately after production but instead is allowed to cool according to method step V).

In method step III) of the method according to the invention for production of a molded article, a molded article is created from the thermoplastic polymer produced and heated in method step II). As methods for production of a molded article, the following can be considered; injection molding, extrusion molding, compression molding, layer molding, laminate molding, hollow molding, vacuum molding and transfer molding, wherein injection molding is especially preferred.

In a preferred embodiment of the invention, in another method step IV) at least part of the molded article obtained in method step III) is reduced in its mass cross section in relation to method step III).

Object of the invention is also a method for producing packaging material comprising as method steps the provision of material and a molded article according to the invention and the at least partial surrounding of the material with the molded article.

Another embodiment of the method according to the invention for production of a thermoplastic molded article is that in at least one additional method step IV) at least a part of the molded article obtained in method step III) serves as molded article blank and is reduced in its mass cross-section. The mass cross-section is the cross-section of an area of the molded article that solidly consists of thermoplastic mold mass according to the invention. For example, with containers or vessels, the mass cross-section is the thickness of the wall of this container or vessel. In the case of molded articles with thread or string forms, the mass cross-section is the thickness of these threads or strings. With flatter forms such as boards, layers, webs, films etc. the mass cross-section is thickness of this flat form. For the reduction of the mass cross-section all suitable methods known to the specialist can in principle be considered. These include stretching in one or two directions, drawing in one or two directions, spinning or blowing, both preferably at raised temperatures, at which the thermoplastic composition according to the invention becomes so soft or even fluid that it can be easily stretched, drawn, spun or blown. The part range in which the cross-section reduction is performed preferably accounts for at least 50%, even better 80% of the molded article obtained in Step III). Generally the stretching or drawing is performed when a fiber is to be obtained from the molded article obtained in Step III). In the production of films, the drawing or stretching can be performed in one or more dimensions. Thus a sheet running out of an extruder can be wound onto a roller with a higher speed compared to the output speed from the extruder. If on the other hand, containers or vessels are to be obtained, then apart from stretching, drawing and spinning, principally blowing is used in Step IV). For this purpose the mass cross-section is reduced by application of a gas pressure. The gas pressure is generally so selected that the thermoplastic composition that is usually heated at least to glass transition temperature of the molded article obtained in Step III) can be stretched. Usually the stretching is limited by the use of a form with the final form of the mold. It is also possible that two or more of the method steps I) to IV) can be supplemented by further method steps and/or can at least temporally overlap. This applies especially for the method steps III) and IV).

A contribution to the solution of at least one of the initially stated tasks continues to be provided by a method for manufacturing of a packaged material comprising as method steps:
 a) The provision of material and of a molded article, especially of a film, wherein the molded article can be obtained from the previously described method;
 b) the at least partial surrounding of the material with the molded article.

The material provided in method step a) may, for example, be a pharmaceutical, a cosmetic or a foodstuff. The at least partial surrounding of the material can for example be performed by the method described in DE-A-103 56 769.

Through the use of this according to the invention and its use as lubricant, the problems underlying the invention are addressed.

EXPERIMENTAL PART

1. Manufacture of the Lubricant According to the Invention

Example 1

Distearyl phthalate, Loxiol G 60, Cognis-Oleochemicals

Example 2

Ethylene glycol dipalmitate 90 g ethylene glycol (Fluka), 571 g palmitic acid (Edenol C16 98-100, Cognis-Oleochemicals) and 0.3 g tin (II) oxalate Goldschmidt) were heated under nitrogen. The esterization reaction starts at approx. 170° C. with the formation of water. After 3 hrs the reaction water is drawn off again by applying a vacuum and the vacuum within 4 hrs reduced to approx. 15 mbar. The final temperature was 230° C. at an acid value <6 the reaction was ended. It was cooled to 90° C. and filtered. Yield 568 g, acid value=3.9, dew point 70.5° C.

Example 3

Rilanit AGS, an ethylene glycol ester with a stearic acid/palmitic acid mixture (approx. 50%:50%) from Cognis 2. Production of the Dry Blends From PVC powder and the different additives, a dryblend is produced in a mixer from Henschel (material amount=3 kg, heating temperature=120° C., then cooled), the compositions are to be obtained from the following table. Lead sulfate also acts in these examples as pigment.

|  | Example: | | |
| --- | --- | --- | --- |
|  | BI | B2 | B3 |
| PVC Evipol SH 6520 | 100 | 100 | 100 |
| Pb-sulfate, 3-basic | 2 | 2 | 2 |
| Lead stearate 28% | 0.5 | 0.5 | 0.5 |
| Calcium stearate | 0.5 | 0.5 | 0.5 |
| Distearyl phthalate | 1 | — | — |
| Ethylene glycol dipalmitate | — | 1 | — |
| RilanitAGS | — | — | 1 |

3. Production of Flat Ribbons

The dryblends were extruded on a double screw extruder from Weber to produce a flat ribbon. (parameters of extrusion: speed=15 rpm; temperature=190° C.). The gloss of the finished ribbons is determined as per DIN 67530.5 measurements were performed and the average found.

| Gloss % | | |
| --- | --- | --- |
| B1 | B2 | B3 |
| 55.1 | 65.7 | 40.0 |
| 55.2 | 63.6 | 44.1 |
| 54.3 | 59.3 | 48.0 |

-continued

| | Gloss % | | |
|---|---|---|---|
| | B1 | B2 | B3 |
| | 48.5 | 62.1 | 39.3 |
| | 50.9 | 61.8 | 43.3 |
| Averages: | 52.8 | 62.5 | 44.36 |

The lubricant according to the invention (B2) produced a very smooth surface and a very high gloss. Distearyl phthalate (B1) is a lubricant that is normally used in such applications and is presented here for comparison. The worst surface is obtained with a lubricant that comprises asymmetric ethylene glycol ester (B3).

What is claimed is:

1. A polymer composition comprising as composition components
   Z1 at least 15% by weight, based on the polymer composition, of at least one thermoplastic polymer;
   Z2 0.001 to 15% by weight, based on the polymer composition, of a diester comprising a mixture of two or more diesters, and wherein one diester is a diester of ethylene glycol with a fatty acid selected from a group consisting of myristic acid, palmitic acid, margaric acid, stearic acid, arachidic acid or behenic acid; and
   Z3 0.1 to 80% by weight, based on the polymer composition, of at least one pigment or at least one filler or a mixture thereof,
   wherein the amount of diesters with different fatty acid residues on a diol is less than 10% by weight, based on the total amount of diesters, and wherein the polymer composition has a high gloss property of from 59.3 to 65.7 according to DIN 67530.5.

2. The polymer composition according to claim 1 wherein the polymer composition comprises a diester comprises ethyleneglycol dipalmitate.

3. The polymer composition according to claim 1 wherein the polymer composition comprises a diester or a mixture of two or more diesters in an amount of about 0.01 to about 10% by weight.

4. The polymer composition according to claim 1 wherein the amount of diesters with different fatty acid residues on a diol is at least 0.1% by weight, based on the total amount of diesters.

5. The polymer composition according to claim 1 wherein the polymer is selected from the group consisting of polyvinyl chloride, polypropylene, polyethylene, polyethylene terephthalate, polylactate, polycarbonate, polystyrolene, polyurethane, polyether, rubber and copolymers from at least two of the aforementioned.

6. The polymer composition according to claim 1 wherein the filler or two or more fillers or the pigment or two or more pigments or a mixture of filler and pigment is comprised in an amount of 0.05 to 60% by weight based on the entire polymer composition.

7. The polymer composition according to claim 1 wherein the polymer composition comprises at least one or several additives.

8. The polymer composition according to claim 7 wherein as additive at least one additive selected from the group consisting of stabilizers, other lubricants, softeners, anti-blocking agents, anti-fogging agents, anti-static agents, flame retardants, dyes, propellants, fats, oils, antioxidants, acid traps, nucleating agents and solvents or a mixture of at least two of them is comprised.

9. A method of producing a polymer composition by bringing into contact at least the following composition components
   Z1 at least 15% by weight, based on the polymer composition, of at least one thermoplastic polymer;
   Z2 0.001 to 15% by weight, based on the polymer composition, of a diester comprising a mixture of two or more diesters, and wherein one diester is a diester of ethylene glycol with a fatty acid selected from a group consisting of myristic acid, palmitic acid, margaric acid, stearic acid, arachidic acid or behenic acid; and
   Z3 0.1 to 80% by weight, based on the polymer composition, of at least one pigment or at least one filler or a mixture thereof,
   wherein the amount of diesters with different fatty acid residues in a molecule is less than 10% by weight, based on the total amount of diesters, and wherein the polymer composition has a high gloss property of from 59.3 to 65.7 according to DIN 67530.5.

10. The polymer composition according to claim 1, wherein the amount of diesters with different fatty acid residues on a diol is less than 8% by weight, based on the total amount of diesters.

11. The polymer composition according to claim 1, wherein the diester comprises ethyleneglycol dipalmitate.

12. The polymer composition according to claim 1, wherein the amount of diesters with different fatty acid residues on a diol is at least 0.01% by weight, based on the total amount of diesters.

13. The polymer composition according to claim 1, wherein the amount of diesters with different fatty acid residues on a diol is at least 0.001% by weight, based on the total amount of diesters.

14. The polymer composition according to claim 1, wherein the filler or two or more fillers or the pigment or two or more pigments or a mixture of filler and pigment is comprised in an amount of 1 to 50% by weight based on the entire polymer composition.

15. The polymer composition according to claim 1 wherein the thermoplastic polymer is polyvinyl chloride.

16. The method according to claim 9, wherein the amount of diesters with different fatty acid residues in a molecule is less than 8% by weight, based on the total amount of diesters.

17. The method according to claim 9 wherein the thermoplastic polymer is polyvinyl chloride.

* * * * *